US012662231B2

(12) United States Patent
Periyasamy

(10) Patent No.: US 12,662,231 B2
(45) Date of Patent: Jun. 23, 2026

(54) INTEGRATED STRINGER PANEL AND METHOD OF MAKING THEREOF

(71) Applicant: The Boeing Company, Arlington, VA (US)

(72) Inventor: Chinnarajan Periyasamy, Karnataka (IN)

(73) Assignee: THE BOEING COMPANY, Arlington, VA (US)

( * ) Notice: Subject to any disclaimer, the term of this patent is extended or adjusted under 35 U.S.C. 154(b) by 174 days.

(21) Appl. No.: 18/417,550

(22) Filed: Jan. 19, 2024

(65) Prior Publication Data

US 2025/0236382 A1      Jul. 24, 2025

(51) Int. Cl.
  *B64C 1/06*          (2006.01)
  *B64C 1/12*          (2006.01)
  *B64C 3/18*          (2006.01)

(52) U.S. Cl.
  CPC .............. B64C 1/064 (2013.01); B64C 1/068 (2013.01); B64C 1/12 (2013.01); B64C 3/182 (2013.01)

(58) Field of Classification Search
  CPC .......... B64C 1/064; B64C 1/12; B64C 1/068; B64C 3/182
  USPC ....................................................... 244/119
  See application file for complete search history.

(56) References Cited

U.S. PATENT DOCUMENTS

| | | | | | |
|---|---|---|---|---|---|
| 2,234,517 | A | * | 3/1941 | Coffman | ............... E04C 2/3405 |
| | | | | | 428/596 |
| 2,742,247 | A | * | 4/1956 | Lachmann | .............. B64C 21/06 |
| | | | | | 244/119 |
| 3,029,910 | A | * | 4/1962 | Kirk | ........................... B64C 1/12 |
| | | | | | 52/630 |
| 4,416,349 | A | * | 11/1983 | Jacobs | ....................... B64C 3/18 |
| | | | | | 428/116 |
| 7,673,832 | B2 | * | 3/2010 | Meister | ................... B64C 21/06 |
| | | | | | 244/134 R |
| 11,220,345 | B2 | * | 1/2022 | Heck | ........................ B64C 21/06 |
| 11,541,982 | B2 | | 1/2023 | Periyasamy et al. | |
| 11,866,165 | B2 | * | 1/2024 | Deatrick | ................ B64D 37/08 |
| 12,162,600 | B2 | * | 12/2024 | Heaysman | ................ B64C 1/00 |
| 2004/0075023 | A1 | | 4/2004 | Assler et al. | |
| 2010/0170988 | A1 | * | 7/2010 | Meyer | ..................... B64C 1/068 |
| | | | | | 156/243 |
| 2012/0187246 | A1 | * | 7/2012 | Motohashi | ............. B64D 37/06 |
| | | | | | 244/123.1 |
| 2015/0251400 | A1 | * | 9/2015 | Goehlich | .............. B29C 70/342 |
| | | | | | 156/196 |

(Continued)

FOREIGN PATENT DOCUMENTS

| | | | | | |
|---|---|---|---|---|---|
| EP | | 3715241 A1 | * | 9/2020 | ............. B64C 1/061 |
| WO | WO-2009000734 A2 | | * | 12/2008 | ............. B64C 1/064 |
| WO | WO-2013099110 A1 | | * | 7/2013 | ............... B64C 3/34 |

*Primary Examiner* — Brent W Herring

(74) *Attorney, Agent, or Firm* — MH2 Technology Law Group LLP

(57)          ABSTRACT

An integrated stringer panel for an aircraft, including a base panel comprising a sheet-like continuous part; and a stringer panel comprising a sheet-like continuous part, wherein the base panel is bonded to the stringer panel, wherein the stringer panel is corrugated to define two or more stringer channels, and one or more raised areas between the two or more stringer channels, and wherein the one or more raised areas include one or more openings to allow access to the base panel through the stringer panel.

20 Claims, 8 Drawing Sheets

(56)  References Cited

U.S. PATENT DOCUMENTS

| 2018/0142622 | A1* | 5/2018 | Biset | G10K 11/172 |
| 2022/0024556 | A1* | 1/2022 | Heaysman | B29C 70/865 |
| 2023/0312077 | A1* | 10/2023 | Deatrick | B64C 3/182 |
| | | | | 244/119 |

* cited by examiner

1000

| SPECIFICATION AND DESIGN | 1102 |
| MATERIAL PROCUREMENT | 1104 |
| COMPONENT AND SUBASSEMBLY MANUFACTURING | 1106 |
| SYSTEM INTEGRATION | 1108 |
| CERTIFICATION AND DELIVERY | 1110 |
| IN SERVICE | 1112 |
| MAINTENANCE AND SERVICE | 1114 |

INTEGRATED STRINGER PANEL AND METHOD OF MAKING THEREOF

TECHNICAL FIELD

The present invention generally relates to a stiffened structural component for an aircraft, and an aircraft having such a component, and more particularly, to an integrated stringer panel for an aircraft and a method of making the same.

BACKGROUND

Aircraft are often manufactured using surface-like components with attached stiffening elements. In particular, stiffened structural components for an aircraft can be created by joining one or more stiffening elements to a base panel. For example, fuselage components often include a sheet-like outer skin to which a plurality of stiffening elements or stringers are attached. The stringers can conform to a shape of the skin, and can be bonded, glued, or riveted to the skin. Currently, the process of creating a stiffened structural component requires the separate production of a plurality of stringers, their correct individual placement on the base panel, and their appropriate joining to the base panel. In many cases, individual stringers are riveted to the base panel using hundreds or thousands of rivets.

Accordingly, there is a need for a stiffened structural component that replaces individual stringers with a continuous stringer panel that can be combined with a base panel in a streamlined production process.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing an integrated stringer panel for an aircraft, comprising: a base panel comprising a sheet-like continuous part; and a stringer panel comprising a sheet-like continuous part, wherein the base panel is bonded to the stringer panel, wherein the stringer panel is corrugated to define: two or more stringer channels, and one or more raised areas between the two or more stringer channels, and wherein the one or more raised areas comprise one or more openings to allow access to the base panel through the stringer panel.

The stringer panel can be integrally formed to define the two or more stringer channels, the one or more raised areas, and the one or more openings.

The stringer panel can be bonded to the base panel only along a portion of a first surface corresponding to the two or more stringer channels and the one or more raised areas can be not bonded to or in contact with the base panel.

The base panel can comprise at least one of a metal or metal alloy and a composite material, and the stringer panel can comprise at least one of a metal or metal alloy and a composite material.

The two or more stringer channels can extend along substantially an entire length L of the stringer panel.

The two or more stringer channels can be not enclosed.

The stringer panel can be thicker at portions corresponding to the two or more stringer channels.

The one or more raised areas can have a height along a y-axis from about 0.5 inches to about 10.0 inches.

Each of the one or more raised areas can comprises at least one of the one or more openings.

The one or more openings can comprise from about 20% to about 90% of a total surface area of the stringer panel.

Each of the one or more raised areas can define a cavity between the base panel and the stringer panel, and the one or more cavities can be not enclosed and the one or more openings can allow access to the base panel through the one or more cavities.

The integrated stringer panel for an aircraft can further comprise one or more leg brackets bonding the stringer panel to the base panel.

The one or more leg brackets can be disposed within the one or more openings to bond the stringer panel to the base panel.

The stringer panel can be integrally formed to define the two or more stringer channels, the one or more raised areas, the one or more openings, and the one or more leg brackets.

The stringer panel can be bonded to the base panel only along at least a portion of a first surface of the base panel corresponding to the two or more stringer channels and at least a portion of a bottom surface of the leg brackets.

The integrated stringer panel for an aircraft can further comprise an adhesive layer to bond the stringer panel to the base panel disposed between the stringer panel and the base panel.

The foregoing and/or other aspects and utilities embodied in the present disclosure may also be achieved by providing an integrated stringer panel for an aircraft, comprising: a base panel bonded to a stringer panel, wherein the stringer panel is integrally formed to define two or more stringer channels, one or more raised areas between the two or more stringer channels, and one or more openings defined on a top surface of the one or more raised areas, wherein the stringer panel is bonded to the base panel along a portion of a first surface of the stringer panel corresponding to the two or more stringer channels and the one or more raised areas are not bonded to the base panel, and wherein the one or more openings allow access to the base panel through the stringer panel.

The two or more stringer channels can be not enclosed.

Each of the one or more raised areas can define a cavity between the base panel and the stringer panel, the one or more cavities can be not enclosed and the one or more openings can allow access to the base panel through the one or more cavities.

The integrated stringer panel can further comprise one or more leg brackets bonding the stringer panel to the base panel, the one or more leg brackets can be integrally formed in the stringer panel and disposed within the one or more openings.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
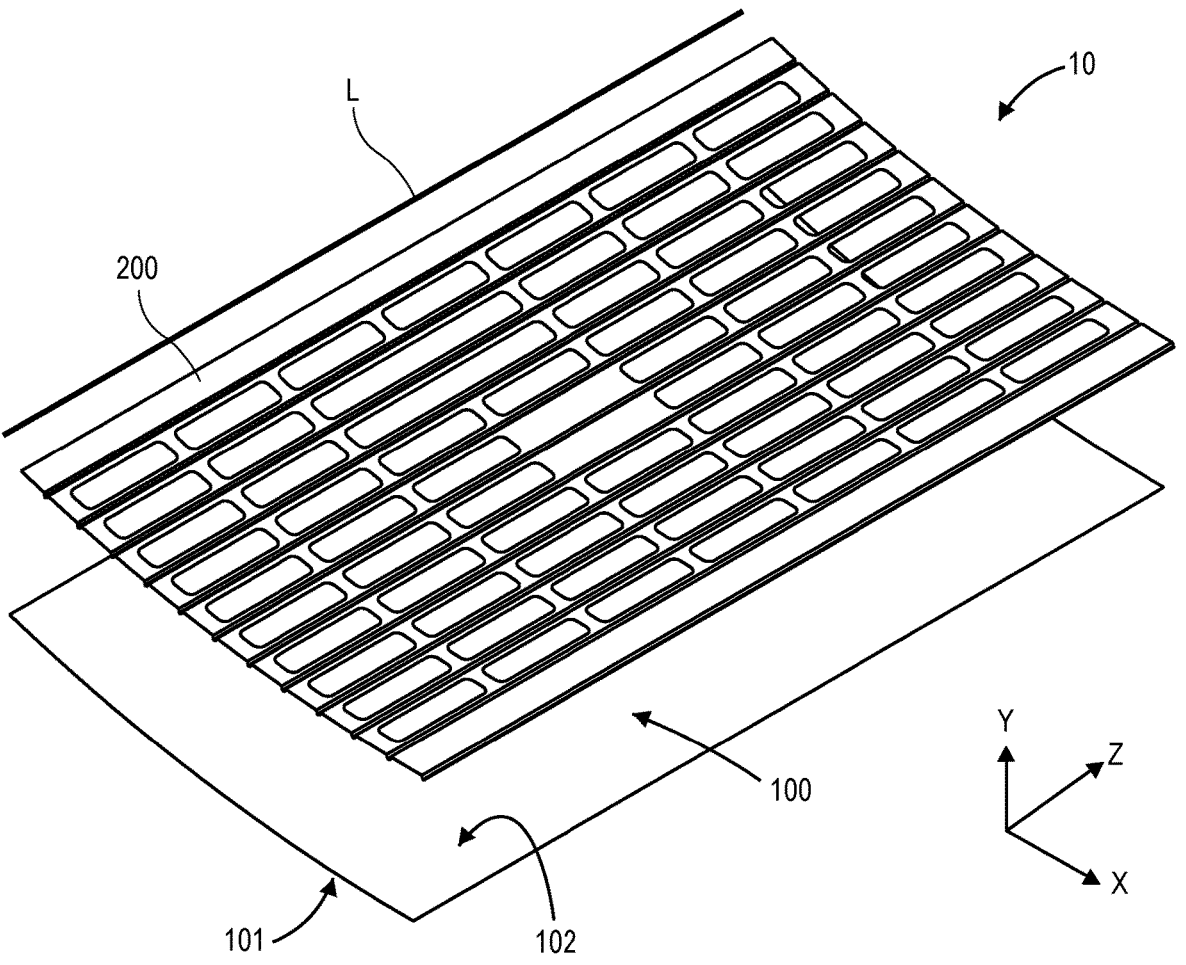
FIG. 1 illustrates an integrated stringer panel for an aircraft according to an implementation of the present disclosure.

It should be noted that some details of the figures have been simplified and are drawn to facilitate understanding of the present teachings rather than to maintain strict structural accuracy, detail, and scale. For example, some figures may present schematic or exploded-view illustrations of the components.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes implementations containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on." Similarly, implementations of the present disclosure may suitably comprise, consist of, or consist essentially of, the elements A, B, C, etc.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 15° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

FIGS. 1-4 illustrate an integrated stringer panel for an aircraft according to an implementation of the present disclosure. FIG. 5-6 illustrate an integrated stringer panel for an aircraft according to another implementation of the present disclosure. As illustrated in FIGS. 1-6, an integrated stringer panel for an aircraft 10 can include a base panel 100 and a stringer panel 200, wherein the base panel 100 is bonded to the stringer panel 200.

The base panel 100 can comprise a sheet-like continuous part. For example, the base panel 100 can be implemented as a fuselage skin, having an exterior or first surface 101 and an interior or second surface 102 opposite the first surface 101. The sheet-like nature of the base panel 100 can provide a continuous bonding area for the stringer panel 200. The base panel 100 can be configured for aerodynamic performance, such as a fuselage or wing section exposed to airflow. For example, the first surface 101 of the base panel 100 can be substantially smooth and/or planar to enhance airflow or reduce aerodynamic drag. The base panel 100 can comprise at least one curvature along the x-axis, the y-axis, and/or the z-axis. In another implementation, the base panel 100 can be substantially flat. For example, for floor panel applications. In other implementations, the second surface 102 can be locally machined in pockets at some locations to optimize strength.

The base panel 100 can be from about 24 inches to about 450 inches in width along an x-axis, and from about 24 inches to about 800 inches in length along a z-axis. The base panel 100 can have a sheet thickness 103 along a y-axis from about 0.01 inches to about 0.5 inches. For example, the base panel 100 can be from about 80 inches to about 250 inches wide along the x-axis, the base panel 100 can be from about 150 inches to about 450 inches long along the z-axis, and the base panel 100 can have a sheet thickness 103 along a y-axis from about 0.02 inches to about 0.3 inches.

The base panel 100 can comprise at least one of a metal or metal alloy and a composite material. For example, the base panel 100 can comprise a mixture of materials, such as different metals or metal alloys, different plastic or composite materials, and/or a mix of metallic and composite materials. The base panel 100 can also comprise one or more reinforcement fibers, such as short reinforcing fibers suitable for press-forming.

The base panel 100 can comprise a metal or a metal alloy, such as steel and steel alloys, aluminum and aluminum alloys, and titanium and titanium alloys. In other implementations, the base panel 100 can comprise any suitable metal or metal alloy according to the structural requirements of the base panel 100 and/or the requirements for the forming process of the base panel 100. In one implementation, the base panel 100 comprises aluminum and/or an aluminum alloy. For example, the base panel 100 can comprise a 5000-series aluminum alloy or a 6000-series aluminum alloy.

The base panel 100 can comprise a composite material. For example, the base panel 100 can comprise plastic materials, such as thermoplastic materials. The base panel 100 can comprise one or more plies of composite materials impregnated with resin. For example, the base panel 100 can comprise a fiber-reinforced thermoplastic composite material. In one implementation, the base panel 100 comprises a short fiber-reinforced composite material.

In one implementation, the base panel 100 comprises a thermoplastic material, such as polyamide, polyetherimide, PEKK, PEEK, PAEK, PPS or other suitable materials. In other implementations, the base panel 100 comprises one or more reinforcing fibers.

The stringer panel 200 can comprise a sheet-like continuous part. The stringer panel 200 can be substantially planar and can have a first surface 201 and a second surface 202 opposite the first surface 201. The stringer panel 200 can comprise at least one curvature along the x-axis, the y-axis, and/or the z-axis, and the stringer panel 200 can conform to the at least one curvature of the base panel 100.

The stringer panel 200 can have a width and length corresponding to a width and length of the base panel 100. For example, the stringer panel 200 can be from about 24 inches to about 450 inches, or from about 80 inches to about 250 inches wide along an x-axis, and the stringer panel 200 can be from about 24 inches to about 800 inches, or from about 150 inches to about 450 inches long along a z-axis.

The stringer panel 200 can have a sheet thickness 203 along a y-axis from about 0.01 inches to about 0.5 inches. For example, the stringer panel 200 can have a sheet thickness 203 along a y-axis from about 0.02 inches to about 0.3 inches.

The stringer panel 200 can comprise at least one of a metal or metal alloy and a composite material. For example, the stringer panel 200 can comprise similar materials as described with respect to the base panel 100 above. In another implementation, the stringer panel 200 comprises a different material than the base panel 100.

In one implementation, the stringer panel 200 comprises a material suitable for press-forming, hot-forming, or roll-forming of sheet-like continuous parts.

The stringer panel 200 can comprise a mixture of materials, such as different metals or metal alloys, different plastic or composite materials, and/or a mix of metallic and composite materials. The stringer panel 200 can also comprise one or more reinforcement fibers, such as short reinforcing fibers suitable for press-forming, hot-forming, or roll-forming of sheet-like continuous parts.

The stringer panel 200 can comprise a metal or a metal alloy, such as steel and steel alloys, aluminum and aluminum alloys, and titanium and titanium alloys. In other implementations, the stringer panel 200 can comprise any suitable metal or metal alloy according to the structural requirements of the stringer panel 200 and/or the requirements for the forming process of the stringer panel 200. In one implementation, the stringer panel 200 comprises aluminum and/or an aluminum alloy. For example, the stringer panel 200 can comprise a 5000-series aluminum alloy or a 6000-series aluminum alloy. In another implementation, the stringer panel 200 comprises an aluminum alloy capable of providing sufficient strength and stiffness.

The stringer panel 200 can comprise a composite material. For example, the stringer panel 200 can comprise plastic materials, such as thermoplastic materials. The stringer panel 200 can comprise one or more plies of composite materials impregnated with resin. For example, the stringer panel 200 can comprise a fiber-reinforced thermoplastic composite material.

In one implementation, the stringer panel 200 comprises a thermoplastic material, such as polyamide, polyetherimide, PEKK, PEEK, PAEK, PPS or other suitable materials. In other implementations, the stringer panel 200 comprises one or more reinforcing fibers. For example, the stringer panel 200 can comprise a short fiber-reinforced composite material. In one implementation, the stringer panel comprises an injection molded or formed short fiber-reinforced composite material.

In one implementation, the base panel 100 and the stringer panel 200 comprise the same material. In another implementation, both the base panel 100 and the stringer panel 200 comprise a composite material.

Figure 2:
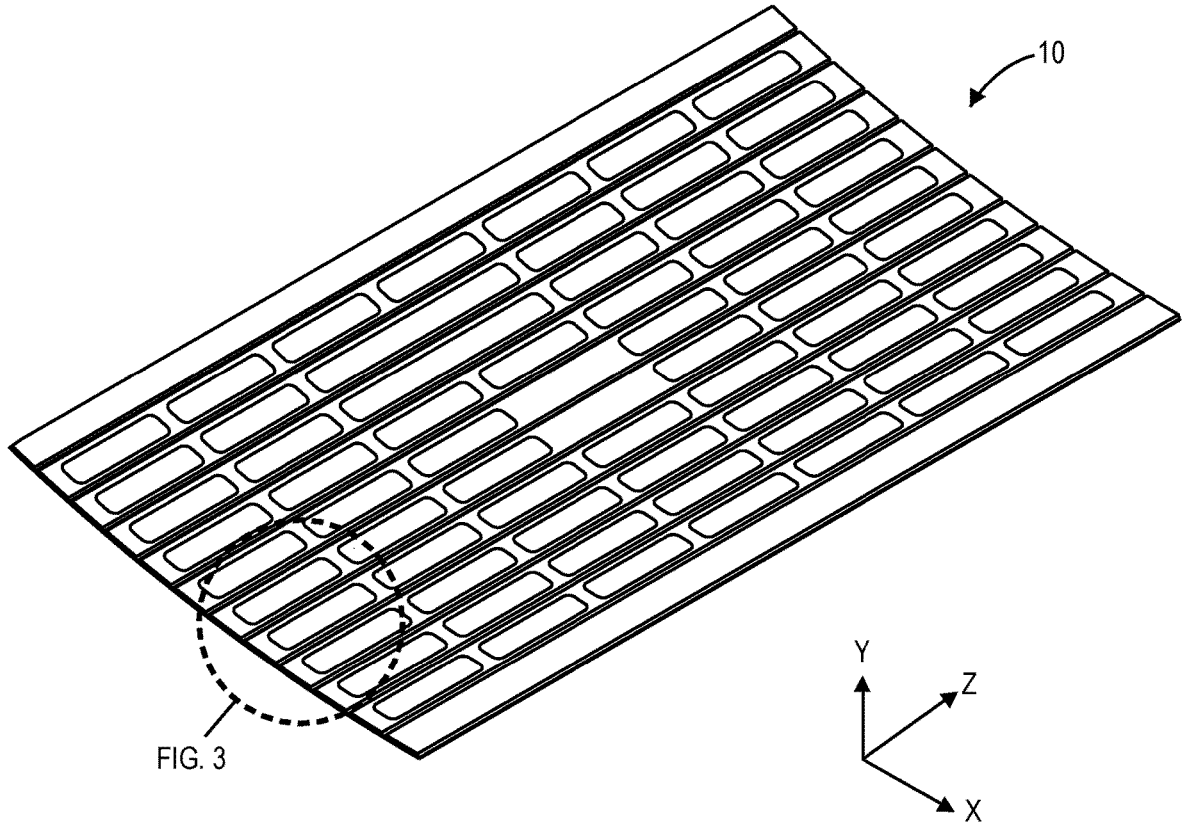
FIG. 2 illustrates an integrated stringer panel for an aircraft according to an implementation of the present disclosure.
Figure 3:
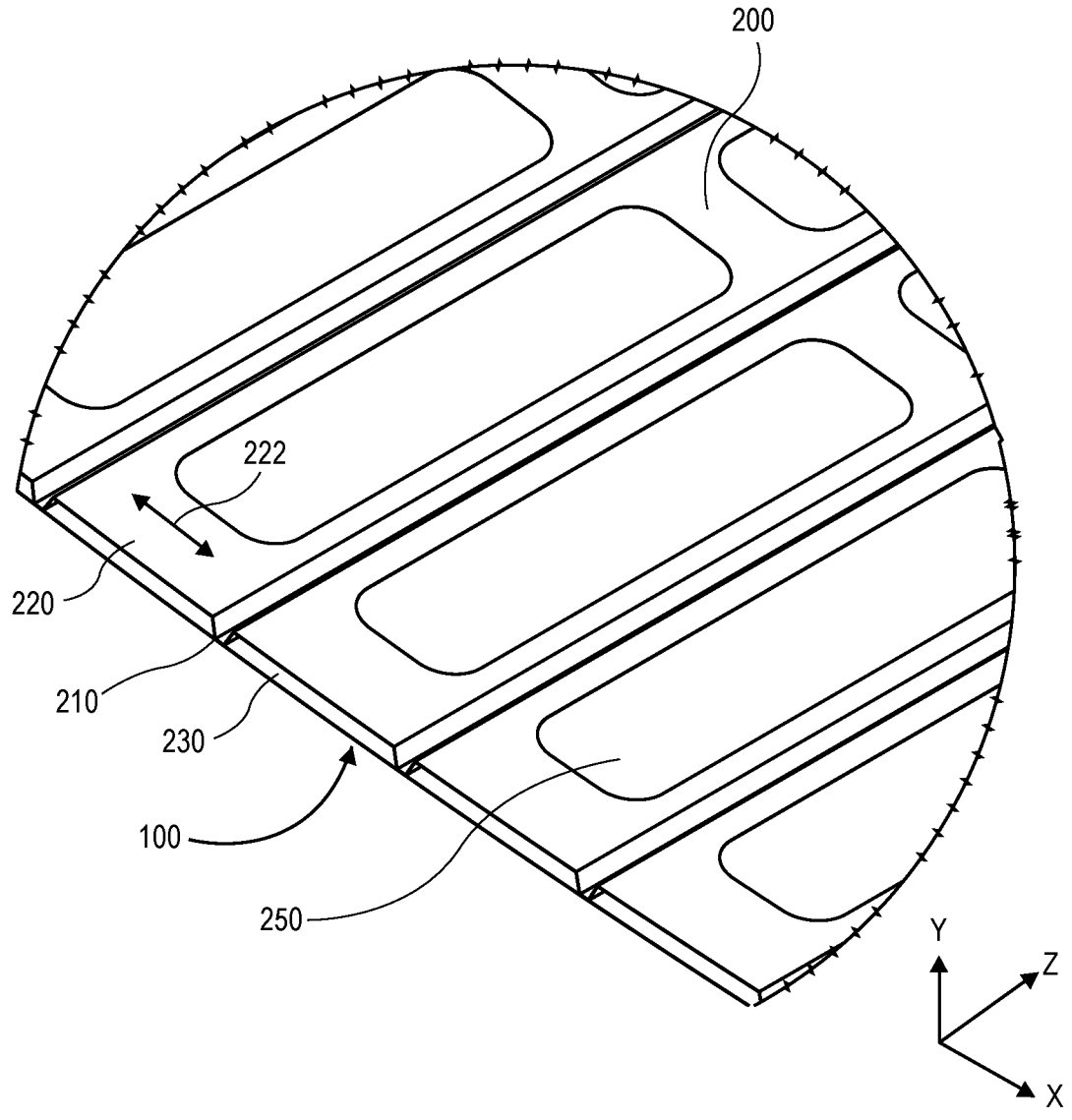
FIG. 3 illustrates an integrated stringer panel for an aircraft according to an implementation of the present disclosure.
Figure 4:
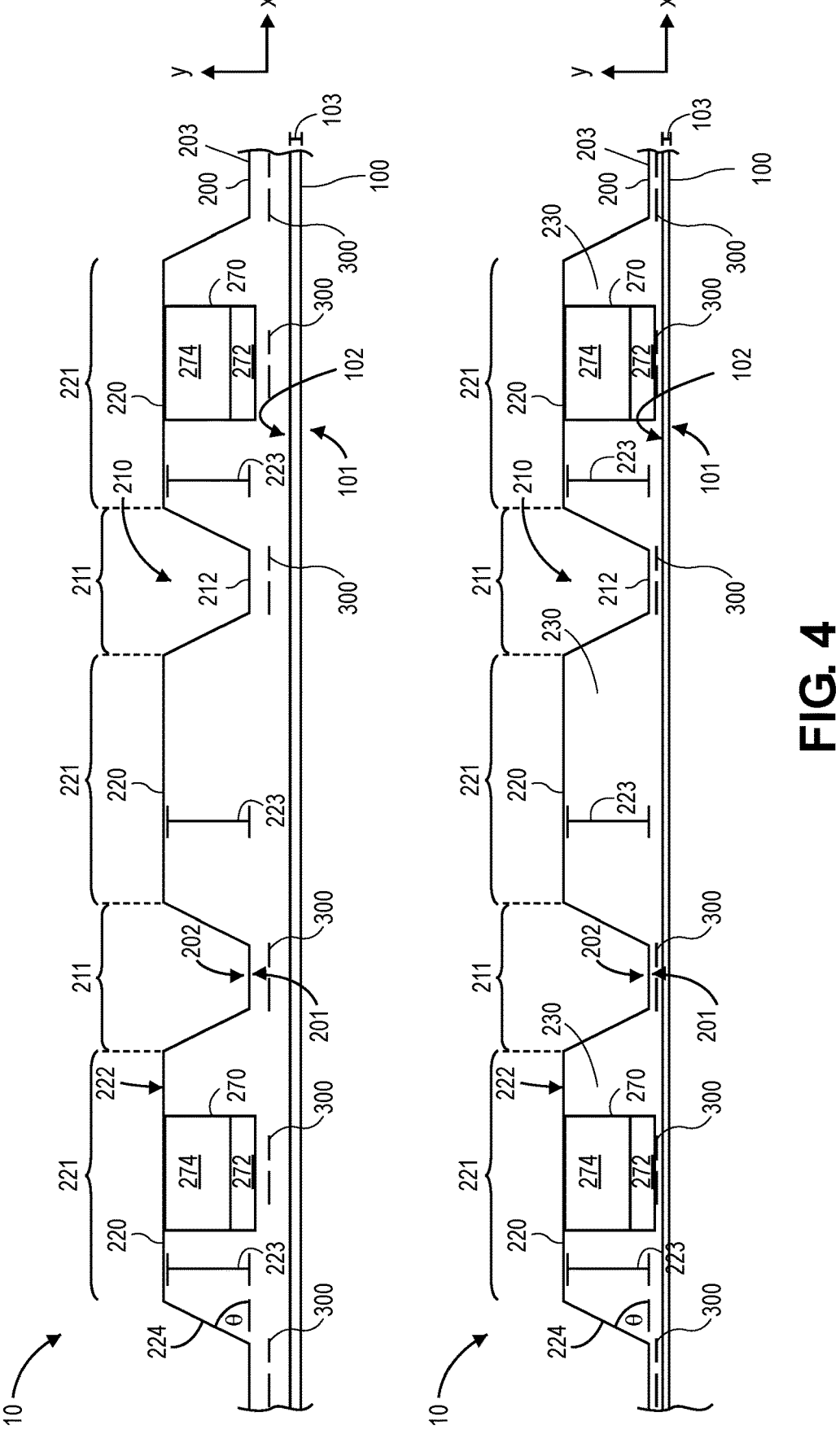
FIG. 4 illustrates an integrated stringer panel for an aircraft according to an implementation of the present disclosure.
Figure 5:
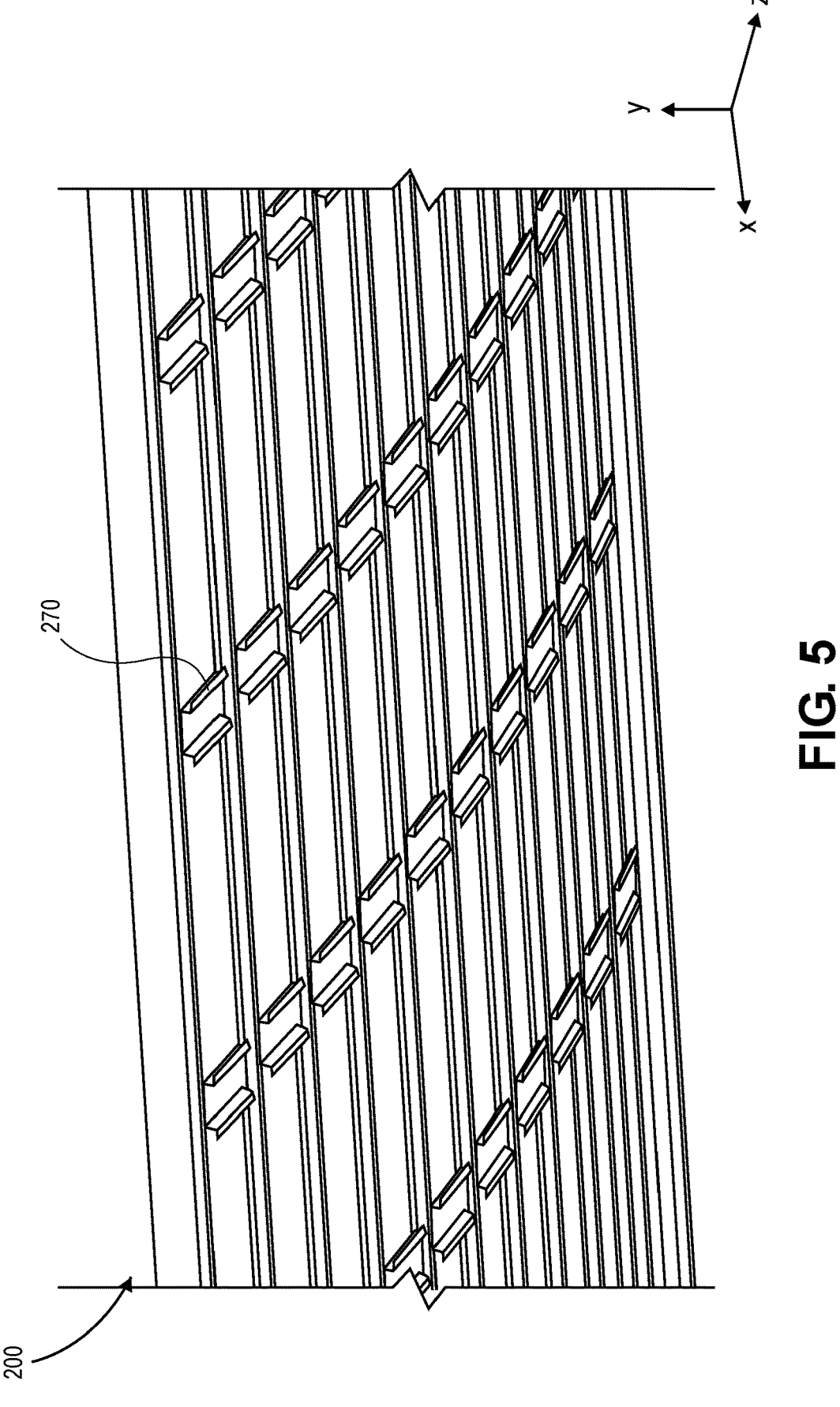
FIG. 5 illustrates an integrated stringer panel for an aircraft according to an implementation of the present disclosure.
Figure 6:
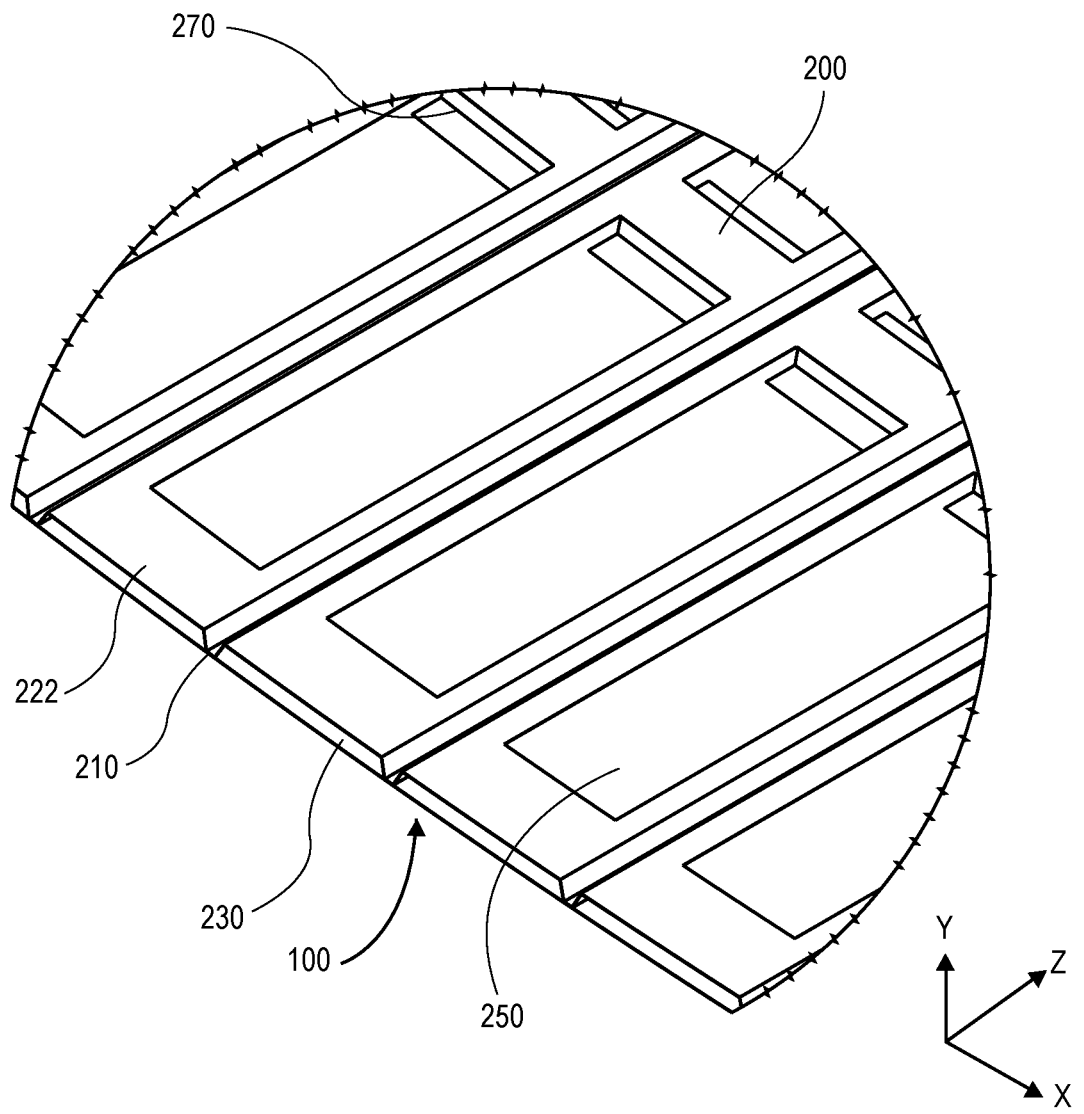
FIG. 6 illustrates an integrated stringer panel for an aircraft according to an implementation of the present disclosure.

As illustrated in FIGS. 1-6, the stringer panel 200 can be shaped to define a plurality of channels and raised areas. In particular, as illustrated in FIG. 4, the stringer panel 200 can be corrugated to define two or more stringer channels 210 and one or more raised areas 220 between the two or more stringer channels 210. The one or more raised areas 220 can protrude out orthogonally from the first surface 201 in a y-axis direction. The two or more stringer channels 210 stringer channels 210 are defined between the one or more raised areas 220. In some implementations, the stringer panel 200 presents a corrugated profile along the x/y axis. As illustrated in FIG. 1, the two or more stringer channels 210 stringer channels 210 can extend along a z-axis. For example, the two or more stringer channels 210 stringer channels 210 can extend along a length L of the stringer panel 200. In some implementations, the two or more stringer channels 210 stringer channels 210 extend along substantially an entire length L of the stringer panel 200 to define two or more stringer channels 210. In other implementation, at least one of the two or more stringer channels 210 is non-continuous. For example, at least one of the two or more stringer channels 210 does not extend along substantially an entire length L of the stringer panel 200 in order to accommodate a cut out, a structural element, or any other system component that would be otherwise affected by a stringer channel.

Each of the two or more stringer channels 210 can have a maximum width 211 along the x-axis from about 0.2 inches to about 6.0 inches. For example, each of the two or more stringer channels 210 can have a width 211 along the x-axis from about 0.7 inches to about 2.5 inches. In some implementations, all the stringer channels 210 have substantially the same width 211. In other implementations, the two or more stringer channels 210 can have different widths 211. For example, at least one of the two or more stringer channels 210 can have a width 211 different than the rest of the two or more stringer channels 210. In some implementations, the two or more stringer channels 210 are distributed evenly along a width of the stringer panel 200. The length of each of the two or more stringer channels 210 can correspond to a length L of the stringer panel 200. Each of the two or more stringer channels 210 can extend along substantially an entire length L of the stringer panel 200.

The two or more stringer channels 210 can have a similar cross-sectional profile along an x/y axis.

As illustrated in FIG. 4, the two or more stringer channels 210 can have an open-hat profile along an x/y axis. For example, as illustrated in FIG. 4, the two or more stringer channels 210 are not enclosed. Instead, the two or more stringer channels 210 are open channels in the y-axis direction. The open channel nature of the two or more stringer channels 210 allows for easier tooling. In addition, the open channel nature of the two or more stringer channels 210 also allows easier inspection of the area for corrosion and inhibits the trapping of water or moisture.

The one or more raised areas 220 can have a width 221 along the x-axis from about 3.0 inches to about 48.0 inches. For example, the one or more raised areas 220 can have a width 221 from about 8.0 inches to about 16.0 inches. In some implementations, all of the one or more raised areas 220 have substantially the same width 221. In other implementation, the one or more raised areas 220 can have different widths 221. For example, the stringer panel 200 can comprise at least two raised areas 220, and at least one of the at least two raised areas 220 can have a width 221 different than the other one of the at least two raised areas 220. In some implementations, the one or more raised areas 220 are distributed evenly along a width of the stringer panel 200.

The one or more raised areas 220 can have a height 223 along the y-axis from about 0.5 inches to about 10.0 inches. For example, the one or more raised areas 220 can have a height 223 from about 0.5 inches to about 3.0 inches. As illustrated in FIG. 4, the height 223 can be defined from a section of the second surface 202 defining a bottom surface 212 of the two or more stringer channels 210 to a top surface 222 of the corresponding one of the one or more raised areas 220.

As illustrated in FIG. 1, the bottom surface 212 of each of the two or more stringer channels 210 can define a continuous flat surface along a length L of the stringer panel 200.

As illustrated in FIG. 4, lateral sides 224 connect the bottom surface 212 and the top surface 222 to define the one or more raised areas 220 and the two or more stringer channels 210. In some implementations, the one or more raised areas 220 can be defined by a substantially planar surface between lateral sides 224 and the top surface 222 can be substantially planar. The two or more stringer channels 210 can be defined by a substantially planar surface between lateral sides 224 and the bottom surface 212 can be substantially planar. The lateral sides 224 can be substantially orthogonal to the second surface 202 of the stringer panel 200. For example, the lateral sides 224 can be at about 90° to the second surface 202. In other implementations, the lateral sides 224 can be at an angle with respect to the second surface 202. For example, the lateral sides 224 can have an angle θ from about 30° to about 90°, from about 45° to about 90°, or from about 70° to about 90°. The angle can increase a lateral load stability of the stringer panel 200 as compared to a stringer panel 200 with straight lateral sides 224. In some implementation, the lateral sides 224 can define a slightly concave curve.

The first surface 201 can be substantially planar to aid the bonding of the stringer panel 200 to the base panel 100. The first surface 201 can also be curved to match a curvature of the base panel 100 to increase bonding with the stringer panel 200.

As illustrated in FIG. 3, the one or more raised areas 220 can comprise one or more openings 250. For example, one or more openings 250 can be defined in the top surface 222 of the one or more raised areas 220. The one or more openings 250 can be configured to allow access to the base panel 100 through the stringer panel 200.

The one or more raised areas 220 can have a similar cross-sectional profile along an x/y axis.

Each of the one or more raised areas 220 can comprise at least one of the one or more openings 250. In other implementations, at least one of the one or more raised areas 220 does not contain an opening 250.

The one or more openings 250 can comprise from about 20.0% to about 90.0% of a total surface area of the stringer panel 200. In some implementations, at least 30%, 40%, 50%, 60%, 70%, or 80% of the total surface area of the stringer panel 200 is comprised by the one or more openings 250. In one implementation, at least 50% of the total surface area of the stringer panel 200 is comprised by the one or more openings 250.

The one or more openings 250 can comprise from about 20.0% to about 90.0% of a surface area of the one or more raised areas 220. In some implementations, at least 30%, 40%, 50%, 60%, 70%, or 80% of the total surface area for each of the one or more raised areas 220 is comprised by the one or more openings 250. In one implementation, at least 50% of the total surface area for each of the one or more raised areas 220 is comprised by the one or more openings 250.

As illustrated in FIGS. 2-3, the top surface 222 of each of the one or more raised areas 220 can define a continuous surface connecting the lateral sides 224 defining each of the two or more stringer channels 210, even when including the one or more openings 250.

As illustrated in FIGS. 1-6, the integrated stringer panel for an aircraft 10 includes one or more cavities 230. As illustrated in FIG. 4, each of the one or more raised areas 220 defines a cavity 230 between the base panel 100 and the stringer panel 200.

The height of each of the one or more cavities 230 can correspond to the height 223 of each corresponding one of the one or more raised areas 220. For example, each of the one or more cavities 230 can have a height from about 0.5 inches to about 10.0 inches or from about 0.5 inches to about 3.0 inches. As illustrated in FIG. 4, the height of each of the one or more cavities 230 can be defined as the distance in the y-axis from the second surface 102 of the base panel 100 to the top surface 222 of the corresponding one of the one or more raised areas 220. The width of each of the one or more cavities 230 can correspond to the width 221 of the corresponding one of the one or more raised areas 220. For example, each of the one or more cavities 230 can have a width from about 3.0 inches to about 48.0 inches or from about 8.0 inches to about 16.0 inches. The length of each of the one or more cavities 230 can correspond to a length L of the stringer panel 200. Each of the one or more cavities 230 can extend along substantially an entire length L of the stringer panel 200.

The one or more cavities 230 can have a similar cross-sectional profile along an x/y axis.

In some implementations, at least one of the one or more cavities 230 is not enclosed. In other implementations, the one or more cavities 230 are not enclosed. As illustrated in FIG. 3, the one or more openings 250 can be defined in the top surface 222 of the one or more raised areas 220 defining each of the one or more cavities 230. Accordingly, the one or more cavities 230 allow access to an interior of the one or more cavities 230 and also allow access to the base panel 100 through the one or more openings 250. In one implementation, the one or more cavities 230 are not enclosed and the one or more openings 250 allow access to the base panel 100 through the one or more cavities 230.

The one or more cavities 230 can be separated by the two or more stringer channels 210 such that the one or more cavities 230 are not in liquid communication with each other. The one or more cavities 230 can therefore form semi-closed structures providing additional torsional stiffness to the integrated stringer panel for an aircraft 10.

The one or more openings 250 offer access to the base panel 100, release water that may be collected in the one or more cavities 230, and also serve to facilitate structural inspection of the integrated stringer panel for an aircraft 10, and facilitate placement and holding of the stringer panel 200 when bonding it to the base panel 100.

The open nature of the two or more stringer channels 210 combined with the non-enclosed one or more cavities 230 (non-enclosed due to the one or more openings 250) allow the formation of an integrated stringer panel for an aircraft 10 with open spaces and no fully enclosed section where water can accumulate, decreasing the likelihood of water induced corrosion. In addition, the integrated stringer panel for an aircraft 10 is open and easily inspectable either vi a visual inspection or using minimal equipment. The open nature of the integrated stringer panel for an aircraft 10 allows the used of easier tooling when compared to closed stringer panels, where special tooling inside the close sections, such as mandrels or other structural supports, may be needed to avoid deflation.

As illustrated in FIGS. 5-6, in some implementations, the integrated stringer panel for an aircraft 10 can further comprise one or more leg brackets 270 bonding the stringer panel 200 to the base panel 100. For example, the one or more leg brackets 270 can be disposed within the one or more openings 250 to bond the stringer panel 200 to the base panel 100. An overall size and width of the one or more leg brackets 270 can be selected to correspond to the one or more openings 250. For example, the size or width of the one or more leg brackets 270 is configured to fit within the one or more openings 250 and can correspond to the height of the one or more cavities 230 or the one or more raised areas 220.

The one or more leg brackets 270 can comprise at least one of a metal or metal alloy and a composite material. For example, the one or more leg brackets 270 can comprise the same or similar materials as described with respect to the base panel 100 or the stringer panel 200 above. In some implementations, the one or more leg brackets 270 comprise the same material as the stringer panel 200.

Each of the one or more leg brackets 270 can comprise a bottom surface 272 and a lateral surface 274. The lateral surface 274 can connect each of the one or more leg brackets 270 to an edge of the top surface 222 defining one of the one or more openings 250. As illustrated in FIGS. 5-6, the lateral surface 274 can connect to an edge of the top surface 222 defining one of the one or more openings 250 along an x-axis. However, in other implementations, the lateral surface 274 can connect to an edge of the top surface 222 defining one of the one or more openings 250 along a z-axis. The lateral surface 274 can extend along the y-axis in a direction orthogonal to the top surface 222 of the one or more raised areas 220 or the second surface 202 of the stringer panel 200. In some implementations, the lateral surface 274 is substantially orthogonal to the top surface 222 or the second surface 202. In other implementations, the lateral surface 274 is at an angle with respect to the second surface 202. For example, the lateral surface 274 can have an angle α from about 30° to about 90°, from about 45° to about 90°, or from about 70° to about 90°. In some implementations, the angle α of the lateral surface 274 corresponds to the angle θ of the lateral sides 224. For example, the angle α can be the same as the angle θ. A height of the lateral surface 274 is sufficient to connect the top surface 222 to the second surface 102 of the base panel 100. For example, the height of the lateral surface 274 can correspond to the height 223 of the one or more raised areas 220. In one implementation, a height of the lateral surface 274 is the same as a height 223 of the one or more raised areas 220.

The bottom surface 272 connects to the lateral surface 274 and can extend along the z-axis in a direction parallel to the top surface 222 or the second surface 102. The bottom surface 272 provides a flat surface configured to bond to the second surface 102 of the base panel 100.

Accordingly, each of the one or more leg brackets 270 can comprise a bottom surface 272 bonded to the base panel 100. The bottom surface 272 can extend on both directions from the lateral surface 274.

The one or more leg brackets 270 can be bonded to the base panel 100. For example, the one or more leg brackets 270 can be bonded to the base panel 100 via adhesives, rivets, bonding layers, etc. In some implementations, the bottom surface 272 of the one or more leg brackets 270 are bonded to the base panel 100. In some implementations, the one or more leg brackets 270 are fusion bonded to the base panel 100.

In some implementations, the one or more leg brackets are bonded to the stringer panel 200. For example, the one or more leg brackets can be bonded to the stringer panel 200 via adhesives, rivets, bonding layers, etc. In other implementations, the one or more leg brackets are formed integrally with the stringer panel 200.

The one or more leg brackets 270 can be integrated to the stringer panel 200 forming simple cleats that can be used to bond the stringer panel 200 to the base panel 100. The stringer panel 200 can be bonded to the base panel 100 only at the bottom surface 272.

As used herein, the term "integrally formed" means formed from a single sheet of material, without the need to bond or join separate components. For example, an integrally formed stringer panel 200 can have all the features described above formed by sheet forming operations like shaping, forming, punching, etc. In one implementation, the stringer panel 200 can be created through a pressing process wherein a planar panel can be pressed to define at least one of the two or more stringer channels 210, the one or more raised areas 220, the one or more openings 250, and the one or more leg brackets 270. In addition, the pressing process can also add a curvature to the stringer panel 200 to correspond to a curvature of the base panel 100. In some implementations, the one or more openings 250 can be machined after or before the pressing process instead of integrally formed with the stringer panel 200. In other implementations, the one or more leg brackets 270 can be separately added to the stringer panel 200 instead of integrally formed with the stringer panel 200. Different pressing processes can be used to form the stringer panel 200 depending on a material of the stringer panel 200. For example, the stringer panel 200 can be formed via cold forming, such as roll forming, wherein the stringer panel 200 is fed into a roll forming tool, and by passing through the tool, at least one of the two or more stringer channels 210, the one or more raised areas 220, the one or more openings 250, and the one or more leg brackets 270 are created. Roll forming can also be used to impart the curvature to the stringer panel 200 at the same time or through multiple sheet forming operations.

In other implementations, hot forming can be used to create the stringer panel 200 whereby the stringer panel 200 is heated to a predetermined temperature according to a material of the stringer panel 200 and at least one of the two or more stringer channels, the one or more raised areas, the one or more openings, and the one or more leg brackets are created in a single step. Hot forming can also be used to impart the curvature to the stringer panel 200 at the same time. If the stringer panel 200 comprises a metallic material, hot forming can include heating the stringer panel 200 above a recrystallization temperature, such as about 300° C. for an aluminum alloy. If the stringer panel 200 comprises a composite material, hot forming can include heating the stringer panel 200 above a temperature sufficient to soften but not melt the composite material.

The stringer panel 200 can be formed via at least one of cold forming and hot forming to form an integrally formed stringer panel 200.

In one implementation, the stringer panel 200 is integrally formed to define the two or more stringer channels 210 and the one or more raised areas 220. In another implementation, the stringer panel 200 is integrally formed to define the two or more stringer channels 210, the one or more raised areas 220, and the one or more openings 250.

For example, the stringer panel 200 is integrally formed to define two or more stringer channels 210, one or more raised areas 220 between the two or more stringer channels 210, and one or more openings 250 defined on a top surface 222 of the one or more raised areas 220. In yet another implementation, the stringer panel 200 is integrally formed to define the two or more stringer channels 210, the one or more raised areas 220, the one or more openings 250, and the one or more leg brackets 270. In yet another implementation, the stringer panel 200 is integrally formed to define the two or more stringer channels 210, the one or more raised areas 220, the one or more openings 250, the one or more leg brackets 270, and the curvature of the stringer panel 200.

Integrally forming the stringer panel 200 with one or more of these features not only minimizes the number of parts used, decreasing costs, and increasing quality, but also eases the manufacturing and tooling required. In addition, a manufacturing and assembly time can be reduced.

As illustrated in FIGS. 2, 3, 4 and 6, the stringer panel 200 is bonded to the base panel 100 to create the integrated stringer panel. The stringer panel 200 can be bonded to the base panel 100 via a variety of methods, such as, via an adhesive, rivets, using a bonding layer, fusion bonding, etc. In one implementation, the stringer panel 200 is bonded to the base panel 100 using an adhesive layer. In other implementations, the stringer panel 200 is bonded to the base panel 100 using fusion bonding. In some implementation, the stringer panel 200 is bonded to the base panel 100 using two or more methods, for example, using rivets and an adhesive layer, or using fusion bonding and rivets. In one implementation, the stringer panel 200 is in direct contact with the base panel 100 and fusion bonded to the base panel 100. In another implementation, there is one or more bonding layers, such as an adhesive layer, bonding the stringer panel 200 to the base panel 100.

The stringer panel 200 can be co-cured with the base panel 100 to bond the stringer panel 200 to the base panel. For example, the stringer panel 200 can be co-cured with the base panel 100 to fusion bond the stringer panel 200 to the base panel 100, or the stringer panel 200 can be co-cured with the base panel 100 and the adhesive layer 300 to bond the stringer panel 200 to the base panel 100.

The stringer panel 200 can be bonded to the base panel 100 only at select areas. For example, the stringer panel 200 can be bonded to the base panel 100 along a portion of the first surface 201 of the stringer panel 200 corresponding to the two or more stringer channels 210. In some implementations, the stringer panel 200 is bonded to the base panel 100 only along a portion of the first surface 201 corresponding to the two or more stringer channels 210. In another implementation, the stringer panel 200 is only bonded to the base panel 100 along substantially the entire portion of the first surface 201 corresponding to the two or more stringer channels 210.

The stringer panel 200 can also be bonded to the base panel 100 along at least a portion of the first surface 201 corresponding to the two or more stringer channels 210 and along at least a portion of the bottom surface 272 of the one or more leg brackets 270. In some implementations, the stringer panel 200 is bonded to the base panel 100 only along at least a portion of the first surface 201 of the base panel 100 corresponding to the two or more stringer channels 210 and at least a portion of the bottom surface 272. In another implementation, the stringer panel 200 is only bonded to the base panel 100 along substantially the entire portion of the first surface 201 corresponding to the two or more stringer channels 210 and substantially all of the bottom surface 272.

In some implementations, the stringer panel 200 is not bonded to the base panel 100 other than at the at least a portion of the first surface 201 corresponding to the two or more stringer channels 210 and the at least a portion of the bottom surface 272. For example, the top surface 222 of the one or more raised areas 220 is not directly bonded to or in direct contact with the base panel 100. In one implementation, the one or more raised areas 220 are not bonded to or in contact with the base panel 100.

In some implementations, the stringer panel 200 is thicker at portions corresponding to the two or more stringer channels 210. For example, the stringer panel 200 can have a greater thickness at a region corresponding to at least a portion of the first surface 201 corresponding to the two or more stringer channels 210. In other implementations, the stringer panel 200 is thicker at substantially all the first surface 201 corresponding to the two or more stringer channels 210.

As illustrated in FIG. 4, in some implementations, the integrated stringer panel for an aircraft 10 can further comprise an adhesive layer 300. The adhesive layer 300 bonds the stringer panel 200 to the base panel 100. The integrated stringer panel for an aircraft 10 can further comprise one or more mechanical bonding devices, such as rivets 400 (not illustrated), configured to help bond the stringer panel 200 to the base panel 100. The adhesive layer 300 can be used together with the one or more mechanical bonding devices, such as rivets 400, to bond the stringer panel 200 to the base panel 100. In other implementations, the adhesive layer 300 is the only bonding component joining the stringer panel 200 to the base panel 100.

As illustrated in FIG. 4, the adhesive layer 300 can be disposed only at select areas. For example, the adhesive layer 300 can be disposed between a portion of the first surface 201 of the stringer panel 200 corresponding to the two or more stringer channels 210 and/or along the bottom surface 272 of the one or more leg brackets. The adhesive layer 300 can be disposed between at least a portion of the first surface 201 corresponding to the two or more stringer channels 210 and/or at least a portion of the bottom surface 272 of the one or more leg brackets 270 and the second surface 102 of the base panel 100. In another implementation, the adhesive layer 300 is disposed between substantially the entire portion of the first surface 201 corresponding to the two or more stringer channels 210 and/or substantially all of the bottom surface 272 and the second surface 102 of the base panel 100.

The adhesive layer 300 can comprise any suitable adhesive configured to bond the stringer panel 200 to the base panel 100. For example, the adhesive layer 300 can comprise adhesive configured to bond metals, metal alloys, and/or composite materials.

The integrated stringer panel for an aircraft 10 can be a fuselage skin component of an aircraft. The integrated stringer panel for an aircraft 10 can be a structural component of an aircraft. For example, the integrated stringer panel for an aircraft 10 can be one of the group consisting of a fuselage skin component, an airframe component, a rear pressure bulkhead, a front pressure bulkhead, a wing shell, a horizontal tail plane shell, a vertical tail plane shell, floor panels for a cabin of the aircraft, primary or secondary flight control surfaces, movable flow bodies in general.

Figure 7:
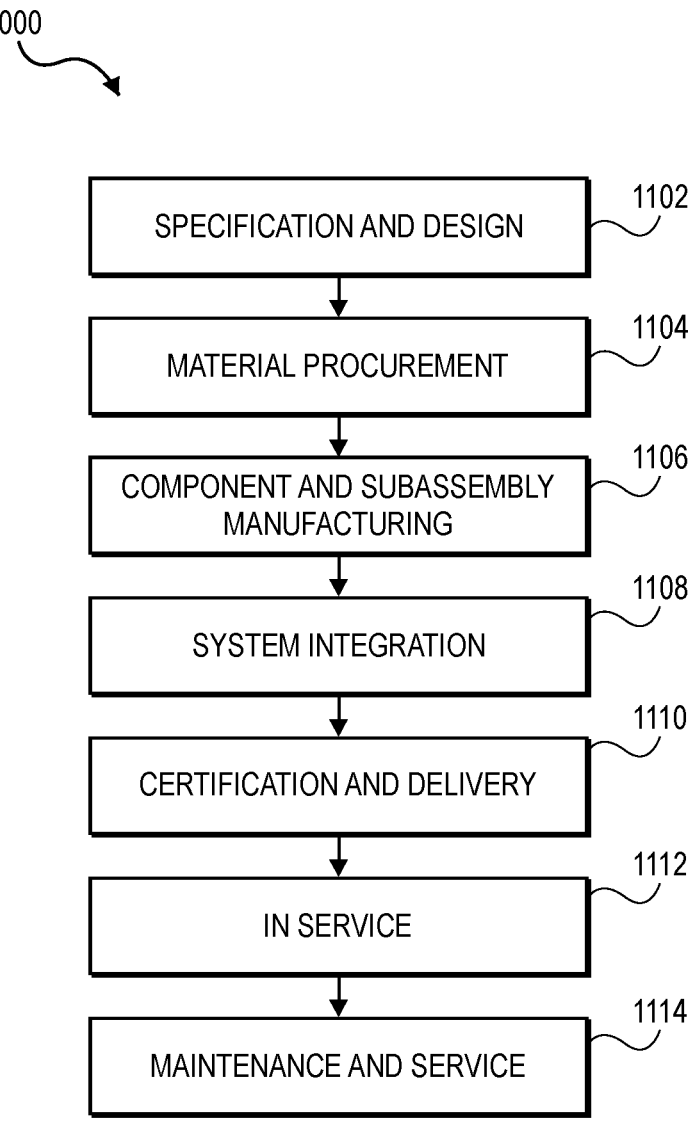
FIG. 7 illustrates a flow diagram of aircraft production and service methodology.
Figure 8:
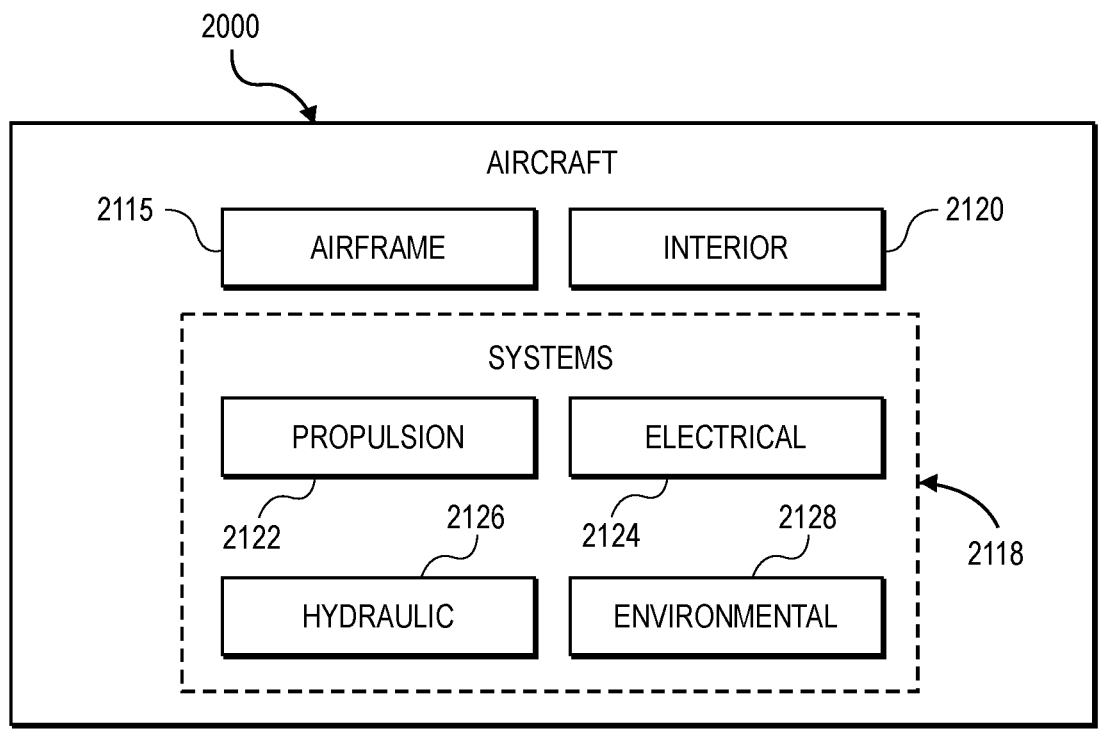
FIG. 8 illustrates a block diagram of an aircraft.

Implementations of the present disclosure may find use in a variety of potential applications, particularly in the transportation industry, including for example, aerospace, marine, automotive applications, and other application where integrated stringer panels for an aircraft are used. Thus, referring now to FIGS. 7 and 8, implementations of the disclosure may be used in the context of an aircraft manufacturing and service method 1000 as shown in FIG. 7 and an aircraft 2000 as shown in FIG. 8. During preproduction, exemplary method 1000 may include specification and design 1102 of the aircraft 2000 and material procurement 1104. During production, component and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 2000 produced by exemplary method 1000 may include an airframe 2115 with a plurality of systems 2118 and an interior 2120. Examples of systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods exemplified herein may be employed during any one or more of the stages of the aircraft manufacturing and service method 1000. For example, components or subassemblies corresponding to production process 1106 may be fabricated or manufactured in a manner similar to components or subassemblies produced while the aircraft 2000 is in service. Also, one or more apparatus examples, method examples, or a combination thereof may be utilized during the production stages 1106 and the 1108, for example, by substantially expediting assembly of or reducing the cost of an aircraft 2000. Similarly, one or more of apparatus examples, method examples, or a combination thereof may be utilized while the aircraft 2000 is in service, for example and without limitation, to maintenance and service 1114.

While FIGS. 7 and 8 describe the disclosure with respect to aircraft and aircraft manufacturing and servicing, the present disclosure is not limited thereto. The integrated stringer panel for an aircraft of the present disclosure may also be used for spacecraft, satellites, submarines, surface ships, automobiles, tanks, trucks, power plants, and any other suitable type of objects.

The present disclosure has been described with reference to exemplary implementations. Although a few implementations have been shown and described, it will be appreciated by those skilled in the art that changes may be made in these implementations without departing from the principles and spirit of preceding detailed description. It is intended that the present disclosure be construed as including all such modifications and alterations insofar as they come within the scope of the appended claims or the equivalents thereof.

What is claimed, is:
1. An integrated stringer panel for an aircraft, comprising:
a base panel comprising a sheet-like continuous part; and
a stringer panel comprising a sheet-like continuous part, wherein the base panel is bonded to the stringer panel,
wherein the stringer panel is corrugated to define:
  two or more stringer channels, and
  one or more raised areas between the two or more
    stringer channels,
wherein the stringer panel is thicker at portions corre-
    sponding to the two or more stringer channels, and
wherein the one or more raised areas comprise one or
    more openings to allow access to the base panel
    through the stringer panel.

2. The integrated stringer panel for an aircraft of claim 1,
wherein the stringer panel is integrally formed to define the
two or more stringer channels, the one or more raised areas,
and the one or more openings.

3. The integrated stringer panel for an aircraft of claim 1,
wherein the stringer panel is bonded to the base panel only
along a portion of a first surface corresponding to the two or
more stringer channels and the one or more raised areas are
not bonded to or in contact with the base panel.

4. The integrated stringer panel for an aircraft of claim 1,
wherein the base panel comprises at least one of a metal or
metal alloy and a composite material, and wherein the
stringer panel comprises at least one of a metal or metal
alloy and a composite material.

5. The integrated stringer panel for an aircraft of claim 1,
wherein the two or more stringer channels extend along
substantially an entire length L of the stringer panel.

6. The integrated stringer panel for an aircraft of claim 1,
wherein the two or more stringer channels are not enclosed.

7. The integrated stringer panel for an aircraft of claim 1,
wherein the one or more raised areas have a height along a
y-axis from about 0.5 inches to about 10.0 inches.

8. The integrated stringer panel for an aircraft of claim 1,
wherein each of the one or more raised areas comprises at
least one of the one or more openings.

9. The integrated stringer panel for an aircraft of claim 1,
wherein the one or more openings are defined on a top
surface of the one or more raised areas, and wherein the one
or more openings comprise from about 20% to about 90% of
a total surface area of the stringer panel.

10. The integrated stringer panel for an aircraft of claim
1, wherein each of the one or more raised areas defines a
cavity between the base panel and the stringer panel, and
wherein the one or more cavities are not enclosed and the
one or more openings allow access to the base panel through
the one or more cavities.

11. The integrated stringer panel for an aircraft of claim 1,
further comprising an adhesive layer to bond the stringer
panel to the base panel disposed between the stringer panel
and the base panel.

12. The integrated stringer panel for an aircraft of claim
1, further comprising one or more leg brackets bonding the
stringer panel to the base panel, wherein the one or more leg
brackets are integrally formed in the stringer panel and
disposed within the one or more openings.

13. The integrated stringer panel for an aircraft of claim
1, wherein the base panel comprises an exterior surface
defining a fuselage skin and an interior surface opposite the
exterior surface of the base panel.

14. The integrated stringer panel for an aircraft of claim
13, wherein the interior surface of the base panel is bonded
to the stringer panel.

15. The integrated stringer panel for an aircraft of claim
14, wherein the one or more raised areas are not bonded to
the interior surface of the base panel.

16. An integrated stringer panel for an aircraft, compris-
ing:
  a base panel comprising a sheet-like continuous part;
  a stringer panel comprising a sheet-like continuous part;
    and
  one or more leg brackets bonding the stringer panel to the
    base panel,
  wherein the stringer panel is corrugated to define:
    two or more stringer channels, and
    one or more raised areas between the two or more
      stringer channels, and
  wherein the one or more raised areas comprise one or
    more openings defined on a top surface of the one or
    more raised areas to allow access to the base panel
    through the stringer panel.

17. The integrated stringer panel for an aircraft of claim
16, wherein the one or more leg brackets are disposed within
the one or more openings to bond the stringer panel to the
base panel.

18. The integrated stringer panel for an aircraft of claim
16, wherein the stringer panel is integrally formed to define
the two or more stringer channels, the one or more raised
areas, the one or more openings, and the one or more leg
brackets.

19. The integrated stringer panel for an aircraft of claim
16, wherein the stringer panel is bonded to the base panel
only along at least a portion of a first surface of the base
panel corresponding to the two or more stringer channels
and at least a portion of a bottom surface of the leg brackets.

20. The integrated stringer panel for an aircraft of claim
16, wherein the base panel comprises an exterior surface
defining a fuselage skin and an interior surface opposite the
exterior surface of the base panel, and wherein the interior
surface of the base panel is bonded to the stringer panel.

* * * * *